(12) United States Patent
Ng et al.

(10) Patent No.: US 7,946,918 B2
(45) Date of Patent: May 24, 2011

(54) ALLOWING MEDIA AND GAMING ENVIRONMENTS TO EFFECTIVELY INTERACT AND/OR AFFECT EACH OTHER

(75) Inventors: Stanley C. Ng, Los Altos, CA (US); Michael D. Lampell, Novato, CA (US)

(73) Assignee: Apple Inc., Cupertino, CA (US)

( * ) Notice: Subject to any disclaimer, the term of this patent is extended or adjusted under 35 U.S.C. 154(b) by 1290 days.

(21) Appl. No.: 11/530,846

(22) Filed: Sep. 11, 2006

(65) Prior Publication Data

US 2008/0076495 A1 Mar. 27, 2008

(51) Int. Cl.
*G06F 17/00* (2006.01)
(52) U.S. Cl. .......................................................... 463/31
(58) Field of Classification Search .............. 463/30–32, 463/16–25, 42
See application file for complete search history.

(56) References Cited

U.S. PATENT DOCUMENTS

| | | | |
|---|---|---|---|
| 7,046,230 B2 * | 5/2006 | Zadesky et al. | 345/156 |
| 7,069,044 B2 * | 6/2006 | Okada et al. | 455/556.1 |
| 7,739,723 B2 * | 6/2010 | Rogers et al. | 726/2 |
| 2005/0110768 A1 | 5/2005 | Marriott et al. | |
| 2007/0191108 A1 * | 8/2007 | Brunet De Courssou et al. | 463/42 |
| 2008/0076495 A1 * | 3/2008 | Ng et al. | 463/1 |
| 2009/0131172 A1 * | 5/2009 | Karstens | 463/40 |

OTHER PUBLICATIONS

U.S. Appl. No. 11/144,541, filed Jun. 3, 2005.
U.S. Appl. No. 11/481,303, filed Jul. 3, 2006.
U.S. Appl. No. 11/530,807, filed Sep. 11, 2006.
U.S. Appl. No. 11/530,767, filed Sep. 11, 2006.
U.S. Appl. No. 11/530,768, filed Sep. 11, 2006.
U.S. Appl. No. 11/530,773, filed Sep. 11, 2006.

* cited by examiner

*Primary Examiner* — Ronald Laneau
(74) *Attorney, Agent, or Firm* — Beyer Law Group LLP

(57) ABSTRACT

Techniques for allowing gaming and media environments to interact with which each other and/or affect each other are disclosed. The techniques are highly suitable for computing systems (or devices) that can execute games and/or present media. In one embodiment, a gaming environment can be determined and/or affected based on one or more aspects of a media environment. By way of example, gaming content and/or the gaming experience provided and/or suggested to an individual can be tailored based on his/her musical profile effectively obtained from the media environment associated with the individual (e.g., based on favorite songs, songs recently played, songs purchased). Similarly, a media environment can be determined and/or or affected by a gaming environment. By way of example, musical content provided and/or suggested to an individual can be based on his/her gaming profile (games played, games purchased, manner in which a game is played). In addition, an open media-gaming environment can be provided where various media and gaming components can be integrated together. By way of example, an individual can identify one or more of his favorite songs to be presented for a game. The game can be packaged and/or sold without the song(s) but configured to receive and effectively provide them for game play.

26 Claims, 11 Drawing Sheets

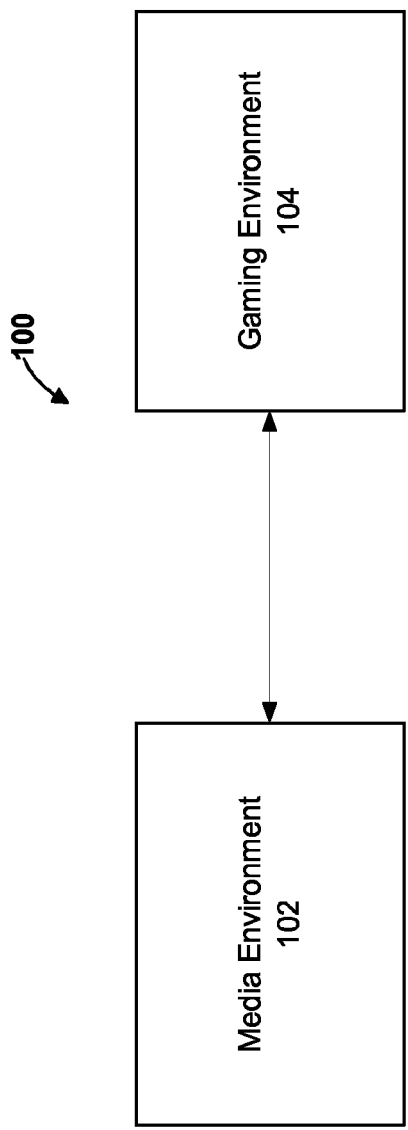

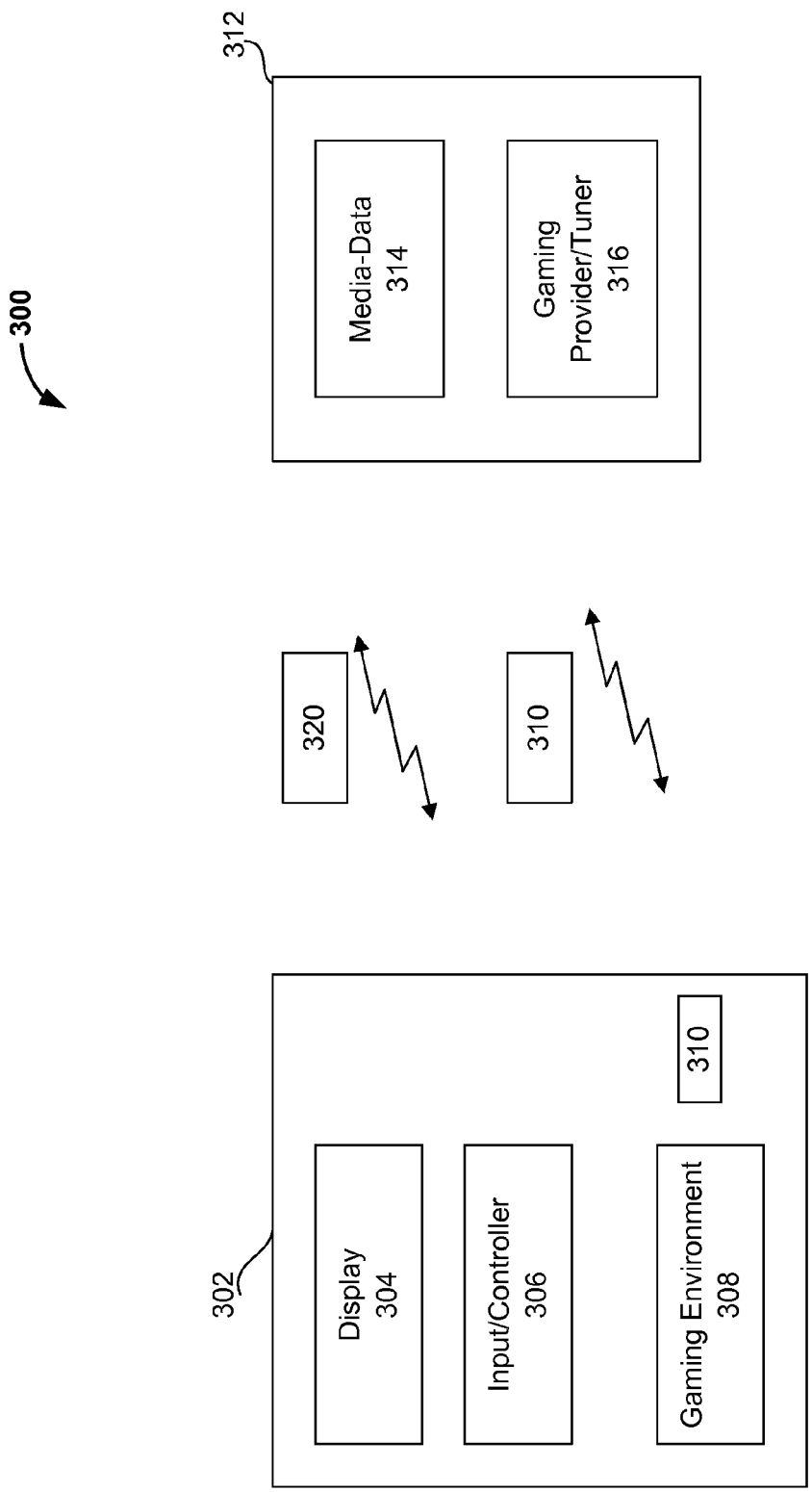

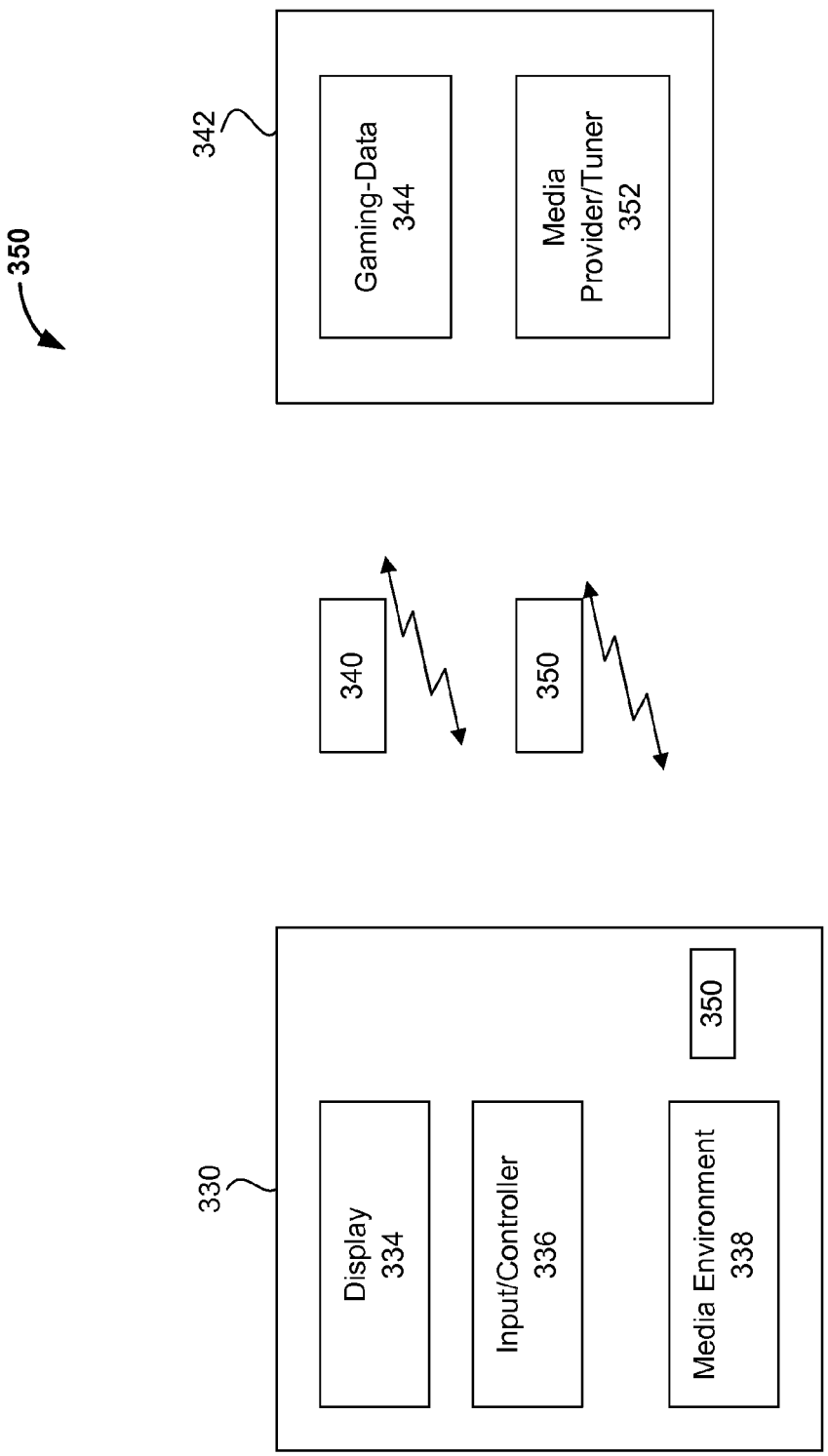

ALLOWING MEDIA AND GAMING ENVIRONMENTS TO EFFECTIVELY INTERACT AND/OR AFFECT EACH OTHER

BACKGROUND OF THE INVENTION

Traditional electronic devices (e.g., cassette players, analog television receiver) have been used to present media for some time now. More recently, digital media players (e.g., portable music players, MP3 players) have become especially popular partly because they can store media as digital data. Generally, media stored as digital data ("media") can be presented in numerous forms including audible, visual, and audio-visual forms. Digital data can be transported electronically, for example, as a digital file stream of data that is accessible by a variety of devices available today (e.g., personal computers, media players, personal assistants, wireless phones). Typically, digital media includes at least digital content (or "content") that represents that actual content of information stored in a digital form. Digital content can, for example, be the content of a printed book, a song in audible form or in an audio-visual form (e.g., a video), movies, sports broadcasts, or news in a variety of forms including text, audio, or audio-visual. As such, digital media players can present one or more forms of media (e.g., audio, video, audio-visual) via various audio (e.g., speakers, headphones) and video output devices (e.g., LCD, CRT displays).

Gaming applications represent another area that has enjoyed wide spread popularity. Various computing systems (or devices) are used for playing games. These computing systems include Personal Computers (PCs), gaming consoles (e.g., Sony Play Station), and various other mobile and/or handheld devices (e.g., mobile phones, mobile gaming controllers). More recently, gaming applications on mobile and/or handheld devices have become especially popular. As such, extensive efforts have been made by a number of entities to provide gaming application on mobile and handheld device.

Given the popularity of media players and games, improved techniques for providing gaming applications and/or presenting media would be useful.

SUMMARY OF THE INVENTION

Broadly speaking, the invention pertains to techniques for allowing gaming and media environments to interact with which each other. The techniques are highly suitable for computing systems (or devices) that can execute games and/or present media. These computing systems include portable, wireless, and/or handheld devices (e.g., the Apple iPod media-player) configured to function both as a media-player and a gaming console that can allow an interactive game to played typically by displaying a game scene and receiving input from an individual, a person, and/or a player. In accordance with one aspect of the invention, media and gaming environments can interact and affect each other. In one embodiment, a gaming environment can be determined and/or affected based on one or more aspects of a media environment. By way of example, gaming content and/or the gaming experience provided and/or suggested to an individual can be tailored based on his/her musical profile effectively obtained from the media environment associated with the individual (e.g., based on favorite songs, songs recently played, songs purchased). Similarly, a media environment can be determined and/or or affected by a gaming environment. By way of example, musical content provided and/or suggested to an individual can be based on his/her gaming profile (games played, games purchased, manner in which a game is played).

Another aspect of the invention provides an open media-gaming environment where various media and gaming components can be integrated together. In one embodiment, a game can effectively present media as defined by an individual. By way of example, an individual can identify one or more of his favorite songs to be presented during the game play. It will be appreciated that the songs can be selected from an individuals own media assets (e.g., songs purchased by an individual and/or stored on a media-player). As such, a game can, for example, be packaged and/or sold without the songs but can be configured to receive and interface with various other media component and subsequently present them during game play.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A depict a computing environment in accordance with one aspect of the invention.

FIG. 1B depicts an integrated media-gaming environment in accordance with one aspect of the invention.

FIGS. 3A-B depict a computing environment in accordance with one embodiment of the invention.

DETAILED DESCRIPTION OF THE INVENTION

Figure 2A:
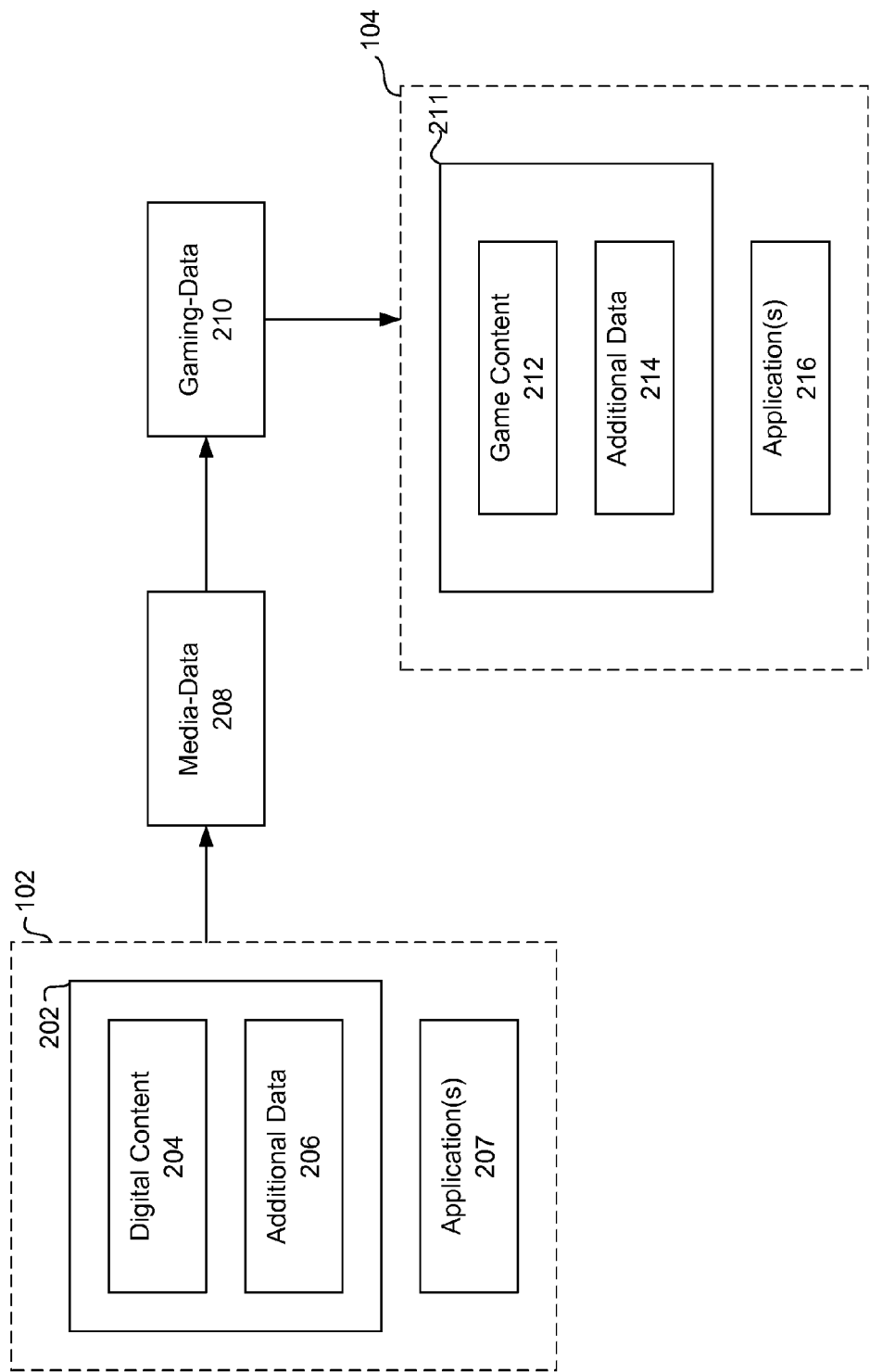
FIG. 2A depicts the interaction between a media environment and a gaming environment in accordance with one embodiment of the invention.

As noted in the background section, digital media players and gaming applications have become very popular recently. As such, extensive efforts have been made by a number of entities to provide both gaming and media presentation capabilities especially on various handheld and/or portable devices (e.g., Apple iPod, mobile phones). Generally, conventional mobile phones provide a limited capability for media presentation and/or gaming). However, Apple iPod provides an extensive media presentation capabilities. In addition to a rich media environment, the Apple iPod can also be configured to provide a robust gaming environment media partly because of the computing power and memory it provides, as well as comprehensive support infrastructure that can be used for distribution of all forms of digital data including songs, movies, games all over the world. As such, Apple iPod is an example of a device that can provide both a gaming environment for playing games and a media environment for presenting media. However, conventional gaming environments are isolated from conventional media environments. Hence, conventionally gaming and media environments do not interact and/or cannot affect each other. It will be appreciated that many benefits can be realized by allowing the gaming and media environments to interact with each other and/or affect each other.

Accordingly, the invention pertains to techniques for allowing gaming and media environments to interact with which each other. The techniques are highly suitable for computing systems (or devices) that can execute games and/or present media. These computing systems include portable, wireless, and/or handheld devices (e.g., the Apple iPod media-player) configured to function both as a media-player and a gaming console that can allow an interactive game to played typically by displaying a game scene and receiving input from an individual, a person, and/or a player. In accordance with one aspect of the invention, media and gaming environments can interact and affect each other. In one embodiment, a gaming environment can be determined and/or affected based on one or more aspects of a media environment. By way of example, gaming content and/or the gaming experience provided and/or suggested to an individual can be tailored based on his/her musical profile effectively obtained from the media environment associated with the individual (e.g., based on favorite songs, songs recently played, songs purchased). Similarly, a media environment can be determined and/or or affected by a gaming environment. By way of example, musical content provided and/or suggested to an individual can be based on his/her gaming profile (games played, games purchased, manner in which a game is played).

Another aspect of the invention provides an open media-gaming environment where various media and gaming components can be integrated together. In one embodiment, a game can effectively present media as defined by an individual. By way of example, an individual can identify one or more of his favorite songs to be presented during the game play. It will be appreciated that the songs can be selected from an individuals own media assets (e.g., songs purchased by an individual and/or stored on a media-player). As such, a game can, for example, be packaged and/or sold without the songs but can be configured to receive and interface with various other media component and subsequently present them during game play.

The invention can be implemented in numerous ways, including a method, an apparatus, a computer readable medium. Several aspects and embodiments of the invention are discussed below.

Embodiments of these aspects of the invention are discussed below with reference to FIGS. 1-7. However, those skilled in the art will readily appreciate that the detailed description given herein with respect to these figures is for explanatory purposes as the invention extends beyond these limited embodiments.

FIG. 1A depicts a computing environment 100 in accordance with one aspect of the invention. Referring to FIG. 1A, the computing environment 100 can conceptually be represented as including a media environment 102 and a gaming environment 104 that can effectively interact with each other and/or affect each other. In other words, the media environment 102 and/or one or more of its aspects can affect the gaming environment 104 and the gaming environment 104 can affect the media environment 102. A typical example of the media environment 102 includes a digital media presentation environment where one or more forms of digital media are presented, for example, be a media player (e.g., a movie or a song is played). In the media presentation environment various aspects of media presentation can be defined or controlled. These aspects, among other things, can include the content and how it is presented. In general, the media environment 102 can include or can be associated with digital media and/or at least one digital media asset including digital data that presents and/or effectively provides the media content for presentation. Similarly, a typical example of the gaming environment 104 can include at least a game (or gaming application) with various other game information (e.g., setting, parameters) that can be packaged with the game or provided separately. Although the gaming environment 104 can include its own media content and possibly media environment, these can at least be conceptually distinguished as they are conventionally provided in a predefined manner for the game.

It will be appreciated that another aspect of the invention allows a closer integration of the media environment 102 and gaming environment 104. FIG. 1B depicts an integrated media-gaming environment 110 in accordance with one aspect of the invention. Referring to FIG. 1B, the integrated media-gaming environment 110 provides an open environment where one or more media components 112 and/or gaming components can be adapted to interact with each other. The integrated media-gaming environment 112, among other things, provides the freedom and flexibility of tailoring the gaming and media presentation environments in accordance to individual interests and tastes. In one embodiment, an individual can effectively select and define the media to be presented for a game. By way of example, an individual can select of one more songs from his or her own favorite songs to be played during a game. This provides an open gaming environment that can be customized, for example, directly by an individual and/or dynamically based on an individuals profile, behavior, and/or preferences. This aspect of the invention that provides an integrated media-gaming environment 110 is further discussed below. However, The interaction between the media environment 102 and gaming environment 104 depicted in FIG. 1A is discussed next.

To further elaborate, FIG. 2A depicts the interaction between a media environment 102 and a gaming environment 104 in accordance with one embodiment of the invention. More particularly, FIG. 2A conceptually illustrates how the gaming environment 104 can be defined and/or affected by the media environment 102. Referring to FIG. 2A, a typical example of a media environment 102 is depicted to include a digital asset (or digital media) 202. Conceptually, the digital asset 202 can be represented to include digital content 204 and additional data (or information) 206 which can be related to the digital content. As an example, the additional data 206 can include attributes associated with the content (e.g., size, permissions) provided by tags effectively attached to the content. As another example, the additional data 202 can include information about how to present the digital content (e.g., define default parameters like volumes, base, terrible for playing digital content). It should be noted that the distinction between the digital content 204 and additional data 206 can be purely a conceptual distinction as it is possible, for example, for the additional information 206 to be packaged with the digital content 204 and/or provided as the same entity.

In any case, media-data 208 is associated with the media environment 208. The media-data 208 can, for example, be effectively determined, received and/or obtained from the digital asset 202. Broadly speaking, media-data 208 can represent one or more aspects (e.g., characteristics, content, attributes, behavior) of the media asset 202 and therefore the media environment 102. It should be noted that the media environment 102 can include other components, for example, one or more applications (e.g., a media-payers) 207 and various other hardware and/or software components (not shown) including input/output devices, physical or virtual locations of components and/or devices used in connection with the media environment 102. As such, the media-data 208 can also represent one or more aspects of these other components. More Generally, the media-data 208 can represent the media environment 102 (e.g., one or more individual items, aspects, characteristics, attributes, and/or setting of the media environment 102). As such, the media-data 206 can, for example, include digital content 204 (e.g., a particular song) and/or additional data 206 (e.g., general information about music setting, specific information about when a particular song was played, hardware and/or software setting or profile). As another example, the media-data 206 can be an audio (e.g., music) profile associated with an owner of the digital asset 202.

It should be noted that the media-data 208 can, for example, be collected by a collector component (not shown) and/or program implemented by software and/or hardware as those skilled in the art will know. Furthermore, those skilled in the art will appreciate that based on the media-data 208, gaming-data 210 can be determined. The gaming-data 208 can, for example, be determined by an analyzer component and/or program (not shown) which can be implemented by hardware and/or software. The gaming-data 210 is provided as input to the gaming environment 104 and can effectively determine and/or affect the gaming environment 104. A typical example of gaming-data can include one or more games (or gaming applications) and/or gaming parameters (e.g., general parameter about game play or a specific parameter for a particular game). The gaming-data 208 can then be effectively used to affect and/or determine the gaming environment 104. The gaming environment 104 can include a gaming asset 211 which conceptually represented to include game content 212 and additional gaming-data (or information) 214 which can be determined and/or affected based on the gaming-data 210. Similar to the media environment 102, the gaming environment 104 can include other applications 216 (e.g., applications that support gaming), as well, as other hardware and/or software components (not shown). Moreover, se other application 216 as well as any other hardware and/or software components of the gaming environment 104 can be determined and/or affected based on the gaming-data 210.

Figure 2B:
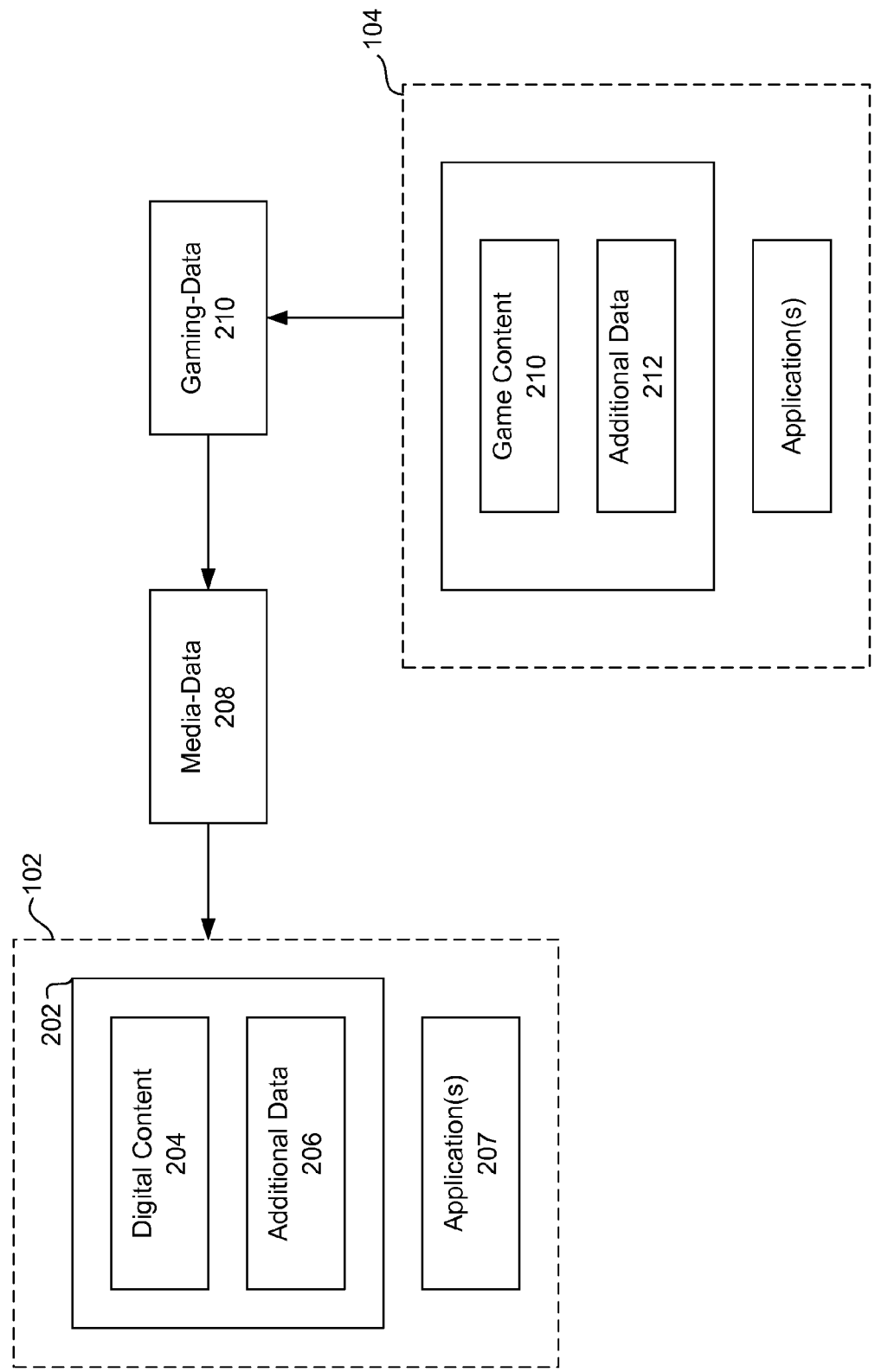
FIG. 2B depicts the interaction between a media environment and a gaming environment in accordance with another embodiment of the invention.
Figure 2C:
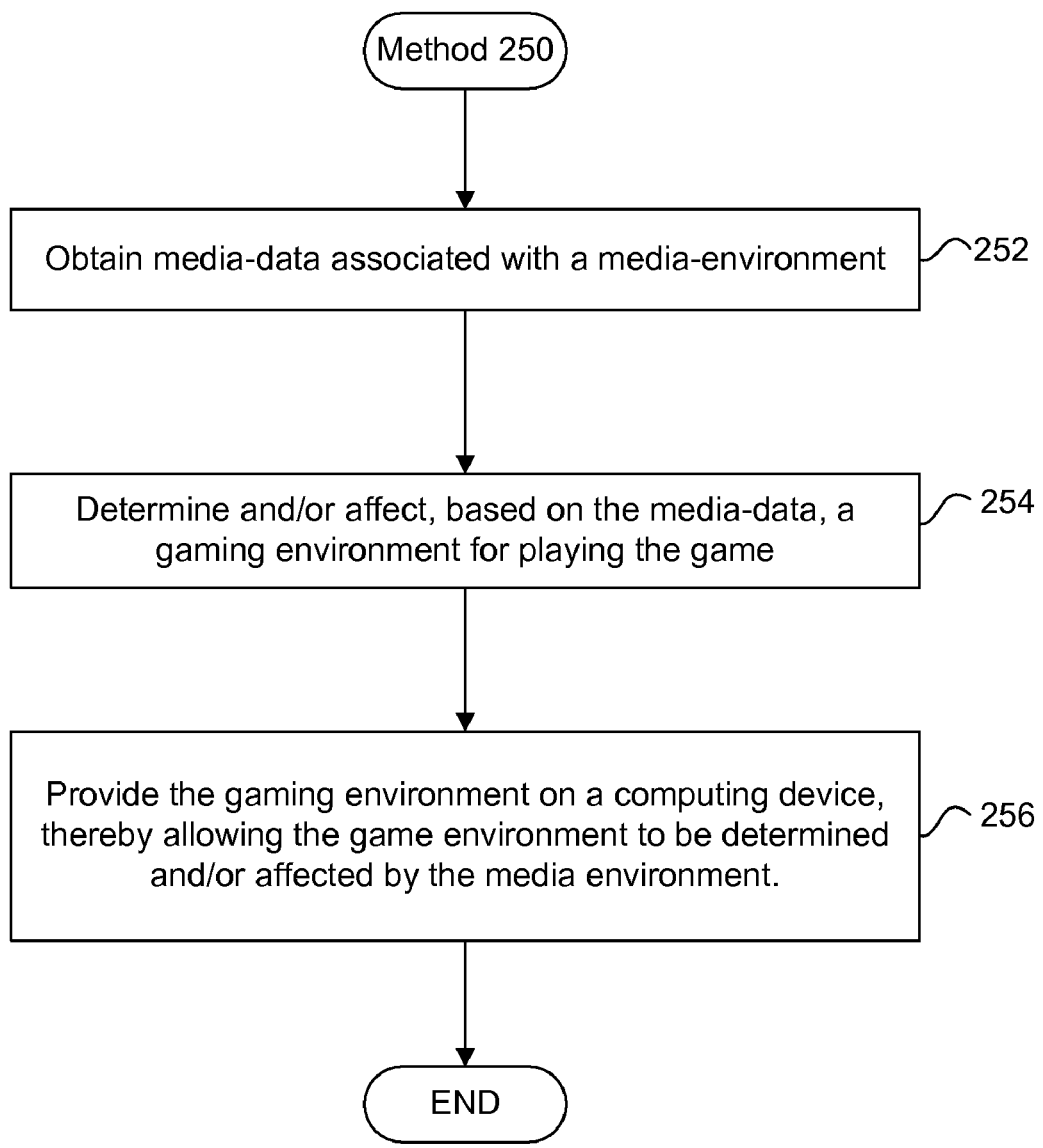
FIG. 2C depicts a method for playing a game in accordance with one embodiment of the invention.

FIG. 2B depicts the interaction between a media environment 102 and a gaming environment 104 in accordance with another embodiment of the invention. More particularly, FIG. 2*b* conceptually illustrates how the media environment 102 can be defined and/or affected by the gaming environment 104. FIG. 2B depicts the reverse of the process depicted in FIG. 2A. As such, it will be understood that gaming-data 210 can be associated and/or effectively represent the gaming environment 104. By way of example, the gaming-data can include or identify game content 210 (e.g., a particular game) and/or additional data 212 (e.g., data about how a particular game is played, data about general gaming habits, a gaming profile). Based on the gaming-data 210, the media-data 208 can be determined. Subsequently, the media environment 102 can be determined and/or affected by the media-data 208, thereby allowing the gaming environment to determine and/or affect the media environment 102 including media content and its presentation. In general, FIG. 2C depicts a method 250 for playing a game in on a computing system (or device) in accordance with another embodiment of the invention. Initially, media-data associated with a media-environment is obtained (252). Next, based on the media-data, a gaming environment for playing the game is determined and/or affected (254). Thereafter, the gaming environment is provided (256) on the computing system, thereby allowing the gaming (or game) environment to be determined and/or affected by the media environment. The method 250 ends after the gaming environment is provided (256).

Figure 2D:
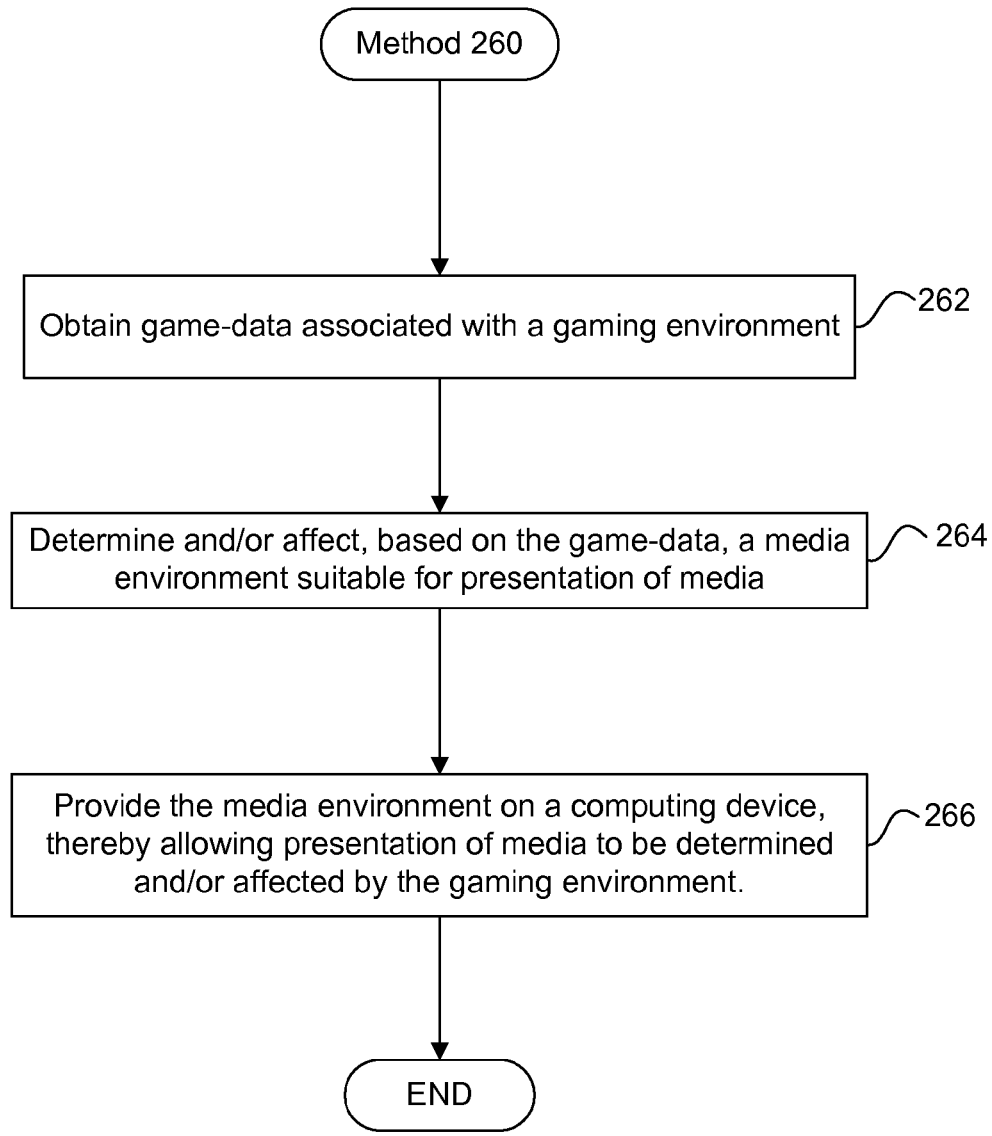
FIG. 2D depicts a method for presentation of media in accordance with one embodiment of the invention.

FIG. 2D depicts a method 260 for presentation of media on a computing system (or device) in accordance with one embodiment of the invention. Initially, game-data associated with a gaming environment is obtained (262). Next, based on the game-data, a media environment suitable for presentation of media is determined and/or affected (264). Thereafter, the media environment is provided (266) on a computing system, thereby allowing presentation of media to be determined and/or affected by the gaming environment.

FIG. 3A depicts a computing environment 300 in accordance with one embodiment of the invention. As shown in FIG. 3A, a computing system (or device) 302 includes a display 304 and an input/controller 306. Although not depicted in FIG. 3A, those skilled in the art will readily know that the computer system 302 can include at least one processor, memory, various other hardware and/or software components, and devices (e.g., input/out put device, networking cards). In addition, the computing system 302 can conceptually include a gaming environment 308 for playing one or more games. Moreover, the computing system 302 can be configured to determine and/or receive the gaming-data 310 which can define and/or affect the gaming environment 308 and consequently game play and/or the gaming experience on the computing system 302. Referring to FIG. 3A, gaming-data 310 can, for example, be determined by another entity, namely, a server 312 based on media-data 314. More particularly, a gaming provider/tuner component and/or program 316 can effectively determine and/or obtain the gaming-data 310 based on media-data 314 associated with a media environment. The media environment can be directly and/or indirectly associated with the computing system 302 and/or another computing system (or device) 320 (e.g., media-player) and/or server 312. In general, the media environment associated with the media-data 314 and/or used to effectively obtain the media-data 314 can be any media environment including those that are closely associated and those that are not even remotely associated with the computing system 302. As such, media-data 314 can be effectively provided and/or collected by the computing system 302, computing system 320 and/or server 312.

FIG. 3B depicts a computing environment 350 in accordance with another embodiment of the invention. As shown in FIG. 3B, a computing system (or device) 330 includes a display 334 and an input/controller 336. In addition, the computing system 330 can conceptually include a media environment 338 which can, for example, include media content, additional data, and a media application (e.g., a media player). Referring to FIG. 3B, media-data 350 can define and/or affect the media-environment 338. The media-data 350 can be determined by a media provider/tuner component 352 configured for a server 342. The media-data 340 can, for example, be determined based on data stored in a database 344 on the server and/or data collected by the computing system 330, another computing system (e.g., a game console) (not shown). In other words, media-data 350 and/or gaming-data 340 can be determined by the computing system 330 and/or based on it activities. It is also possible that media-data 350 and/or gaming-data 340 can be determined by another entity (e.g., server 342) and/or based on activities of another computing system (not shown).

Figure 4:
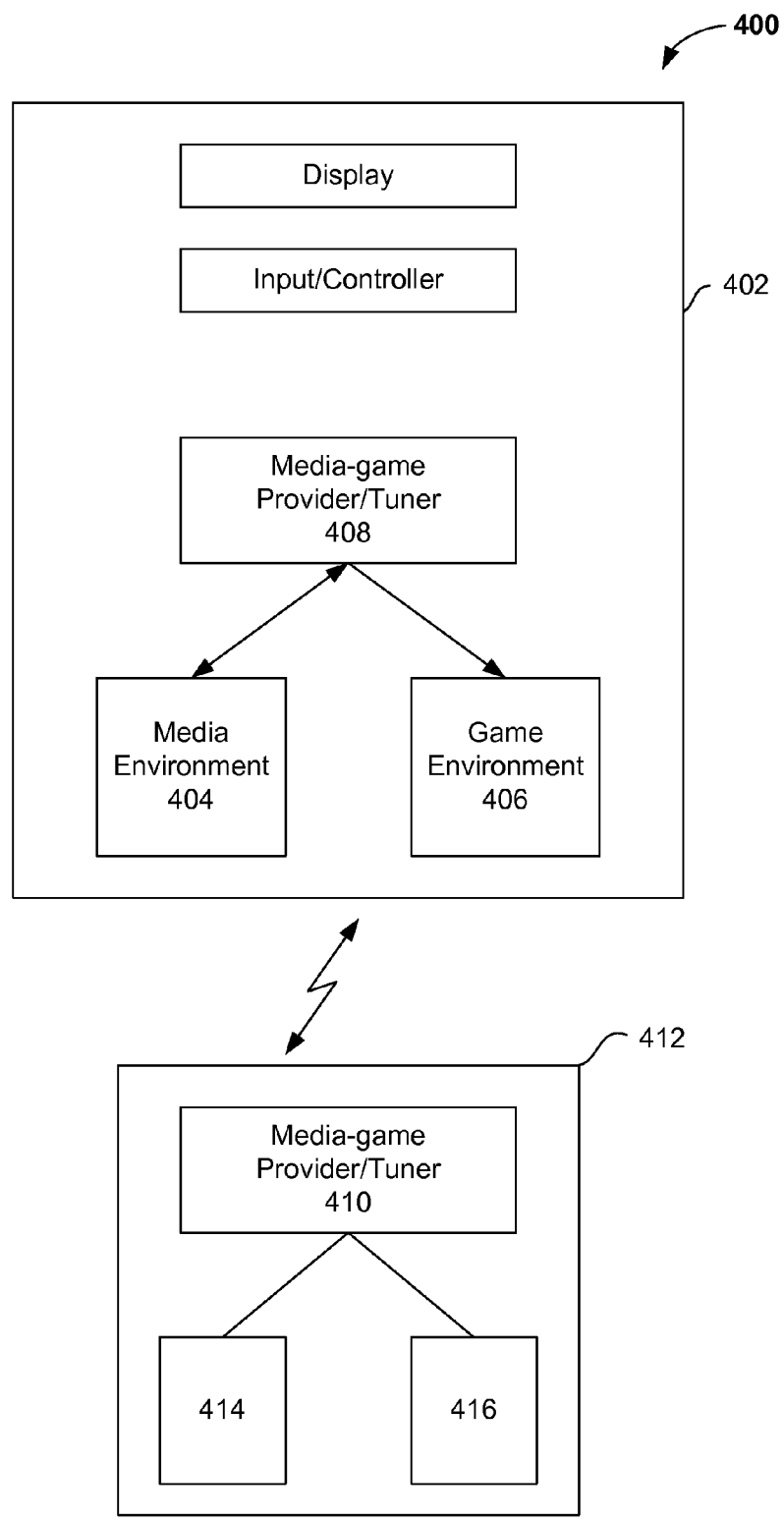
FIG. 4 depicts a computing environment in accordance with another embodiment of the invention.

FIG. 4 depicts a computing environment 400 in accordance with another embodiment of the invention. Referring to FIG. 4, a computing system (or device) 402 can be configured for both media presentation and game play. As such, the computing system 402 can include, effectively provide or be provided with a media environment 404 and a gaming environment 406. The media environment 404, among other things, can define and/or effectively present media (e.g., audio, audio-visual). As such, the media environment 404 can include a media-player for playing audio and/or audio-visual media. The gaming environment 406, among other things, can define and/or effectively provide one or more games to be played on the computing system 400. As such, the gaming environment 406 can include one or more games (or gaming applications) stored in memory and executed on the computing system 402. The game can, for example, be loaded from a computer readable medium (e.g., a Compact Disk, or DVD), or downloaded via a wired or wireless link from another entity (e.g., a server, a website).

Moreover, it will be appreciated that a media-game provider/tuner 408 can effectively determine and/or tune both the media environment 404 and the gaming environment 406. In other words, the media-game provider tuner 408 can determine and/or affect the gaming environment 406 based on media-data and affect the media-environment 404 based on the gaming-data. Generally, the media-data can be associated with and/or effectively derived or obtained form any media-environment. For example, the media-data can be associated with the media environment 404 of the computing system 402. As such, the media-data can effectively describe an aspect of the media environment 404 and used to determine and/or affect the gaming environment 406. Similarly, gaming-data can be associated with the gaming environment 406 and used to determine and/or affect the media environment 404. Media-data and/or gaming-data can be determined and/or obtained by the media-game tuner 408 based on the media environment 404 and gaming environment 406 which can be local to the computing system 402. Media-data and/or gaming-data can also be received from a remote media-game tuner component 410 based on another media environment 414 and/or gaming environment 416 which are remote and possibly not even remotely associated with and/or connected to the computing system 402. It should be noted that it is possible for the media environment 414 and/or gaming environment 416 to effectively include a database that stores information related to the local media environment 404 and gaming environment 406. The media environment 414 and/or gaming environment 416 and/or a database the stores information about the media environment 404 and gaming environment 406 can, for example, be provided by a server 412 in a remote location with respect to the computing system 402. Thus, media-data and gaming-data which can, among other things, affect the presentation of media and game play on the computing system 402 can be determined locally by the media-game provider/tuner 408 and/or remotely by the media-game provider tuner 410. Those skilled in the art will appreciate that the media-game provider/tuners 408 and 410 can, for example, be implemented by computer program code and/or hardware.

Figure 5:
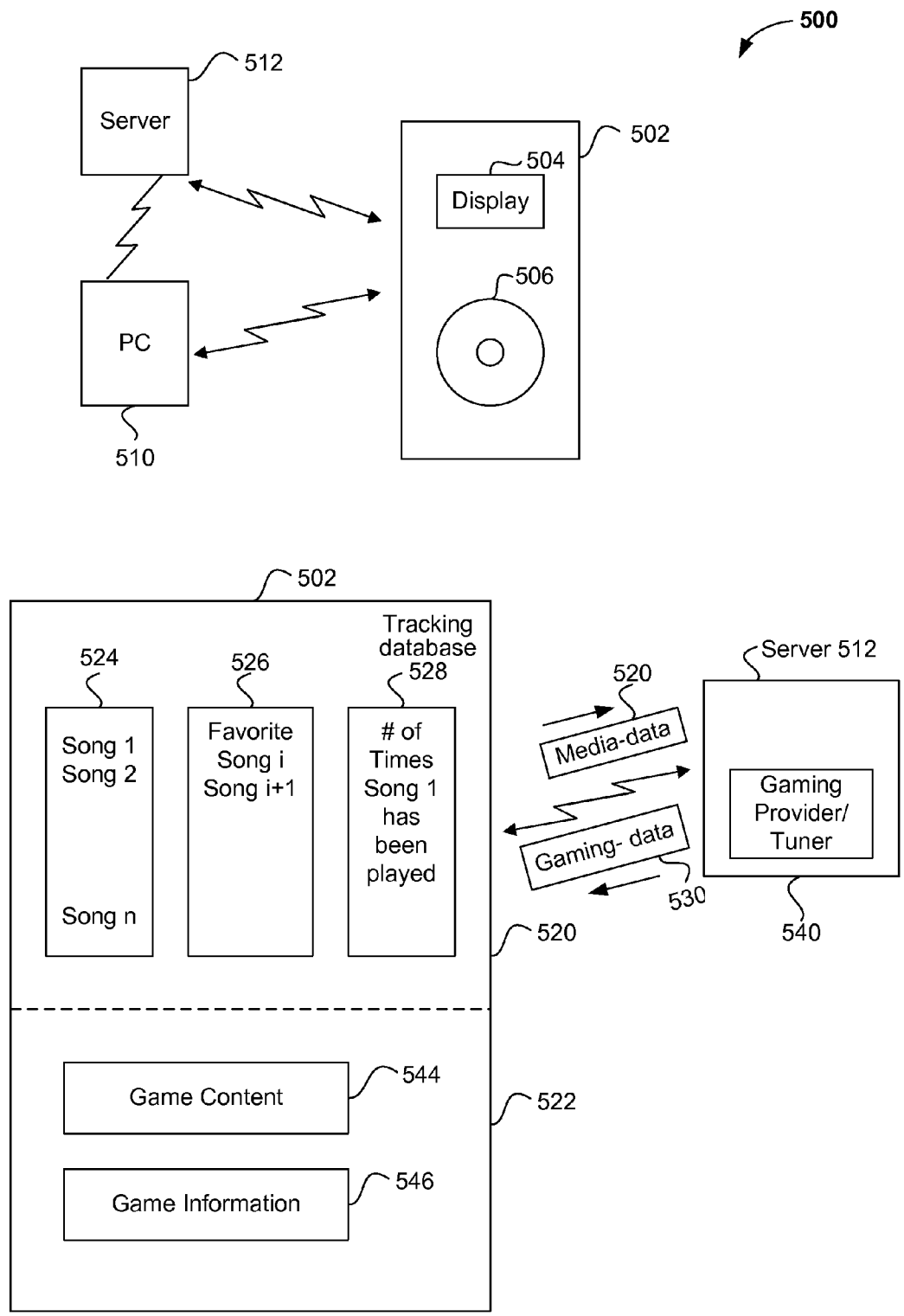
FIG. 5 depicts a computing environment in accordance with yet one embodiment of the invention.

To further elaborate, FIG. 5 depicts a computing environment 500 in accordance with yet one embodiment of the invention. As shown in FIG. 5, a computing system (or device) 502 includes a display 504 and an input device 506. The input device 506 can, for example, be a click-wheel configured to receive rotational input such as that provided by the Apple iPod media-player available from Apple Computer, Inc. It should be noted that the computing system 502 is capable of presenting media and providing a gaming environment that allows a game to be played in connection with images (e.g., a game scene) displayed on the display 504. Typically, input is provided by a human via the input 506 in order to play a game and control the presentation of media. The computing system 502 can also interact with other computing systems (or devices). Referring to FIG. 5, a personal computer (PC) 510 and a server 512 can be in direct and/or indirect communication with the computing system 502 via various wired or wireless mechanisms and/or protocol. Referring back to FIG. 5, the computing system 502 can also be conceptually represented to include a media-environment 520 and a gaming environment 522. For ease of illustration, the media environment 520 can be represented to include a plurality of songs 524 (Si, . . . , Sn) which primarily provide the media content even though they can include additional information encoded therein (e.g., tags, ID's). In addition, a list of favorite songs 526 can be part of the media environment 520. Furthermore, data (or information) related to the media environment 520 can be tracked and stored in a tracking database 528. In general, this data can be tracked based on any desired criteria. A few simple examples include tracking the number of times each song has been played, the last song played, the average volume for presentation of sound. The tracked information and/or information already available (e.g., content of songs 524, favorite songs 526, setting, music profile) can be transmitted directly and/or indirectly to the server 512 as media-data 530. The server 512 can effectively analyze the media-data 520 based on one or more criteria and provide gaming-data 530 that can subsequently be used to determine and/or affect the gaming environment 522. More particularly, a gaming provider/tuner 540 can effectively analyze the media-data 520 and generate and/or identify the gaming-data 530. For example, the last song played, or any song that has been played at least twice in the past week can be selected. Then based on the characteristics of the selected song a particular game and/or character for a game can be effectively provided to the gaming environment. By way of example, a classical song would effectively produce a different game scene and/or character than a rock and roll song. As another example, the list of favorite songs 526 can be considered collectively to generate a game scene using a combination of graphical elements for a game. Each of these graphical elements may correspond to one or more of favorite songs for an individual. Hence, the gaming environment can be tailored to that individual. Furthermore, such individualized gaming environments can be published and shared between individuals in a community. It will be apparent that there is virtually an infinite number of ways to collect and analyze media-data. Also, virtually, any criteria can be used to determine, generate, and/or identify gaming-data to determine and/or affect the gaming environment 522 and game play on the computing system 502. A few other examples are discussed below. It should be noted that the gaming-data can be transmitted to the computing system 502 to, among other things, determine and/or affect the game content 544 and/or game information 546 (e.g., gaming parameters, settings). Accordingly, the gaming experience of an individual can be shaped and/or altered based on his/her particular media profile, interests, and/or behavior.

Those skilled in the art will appreciate that media-data and/or game-data can be represented as Meta-data for processing. By way of example, audio files (or songs) can have tags (e.g., ID3 compliant tag) that provide data (or information) that can be extracted or collected as Meta-Data. The Meta-data can include or effectively represent media-data associated with an audio environment. The Meta-data can be processed to determine gaming-data that can determine and/or affect a gaming environment. Examples of audio-data that can be considered and/or collected include one or more favorite songs, number of times one or more songs or audio files have been played, a play-list listing one or more songs, beats per minute for one or more songs, parameters associated with playing one or more songs (e.g., volume, base and/or terrible), physical location of a computing system when one or more of songs have been played, and so on.

It will also be appreciated that the gaming-data can include, determine and/or affect all aspects of a gaming environment including gaming content itself and various parameters associated with how the game can be played and the gaming experience. Examples of the aspects of the gaming environment that can be determined an/or affected can include: a game category and/or specific game for playing on a computing system, one or more parameters or setting for one or more games, speed for playing one or more games, characters or components associated with one or more games, one or more specific attribute of one or more characters or components of one or more games, one or more general attributes associated with specific and/or general characters or components of one or more games, one or more specific and/or general scenes associated with one or more games.

It will be appreciated that the invention allows individuals to explicitly define their own gaming environments in relation to their own interests (e.g., musical taste). By way of example, an individual can select a particular song and be presented with the art work from the album cover on the back of playing cards used to play a video card game. An individual can purchase a particular song that would allow him to play a particular game and/or play a game in a particular manner (e.g., provide a specific hero for a Role Playing Game, increase the speed, strength, or other attributes associated with a character in a game, provide a particular game scene, allow advancing to the next level of a game). As another example, a particular order or combination of songs can affect the outcome of a game or effectively yield a particular character with abilities corresponding to the song.

It will also be appreciated that the invention allows an open gaming experience where media that is presented during the game can be selected by individuals. By way of example, a game (or gaming application) can be provided that can interface and/or receive media in accordance with one aspect of the invention. In one embodiment, the game is packaged with default media (e.g., songs to be played during various stages of the game). However, alternative and/or additional media can be effectively identified by an individual (e.g., a person can identify one or more songs which are stored on portable device used to play the game). The game can effectively receive and accept the media identified by an individual and provide that media as the game is played.

Figure 6:
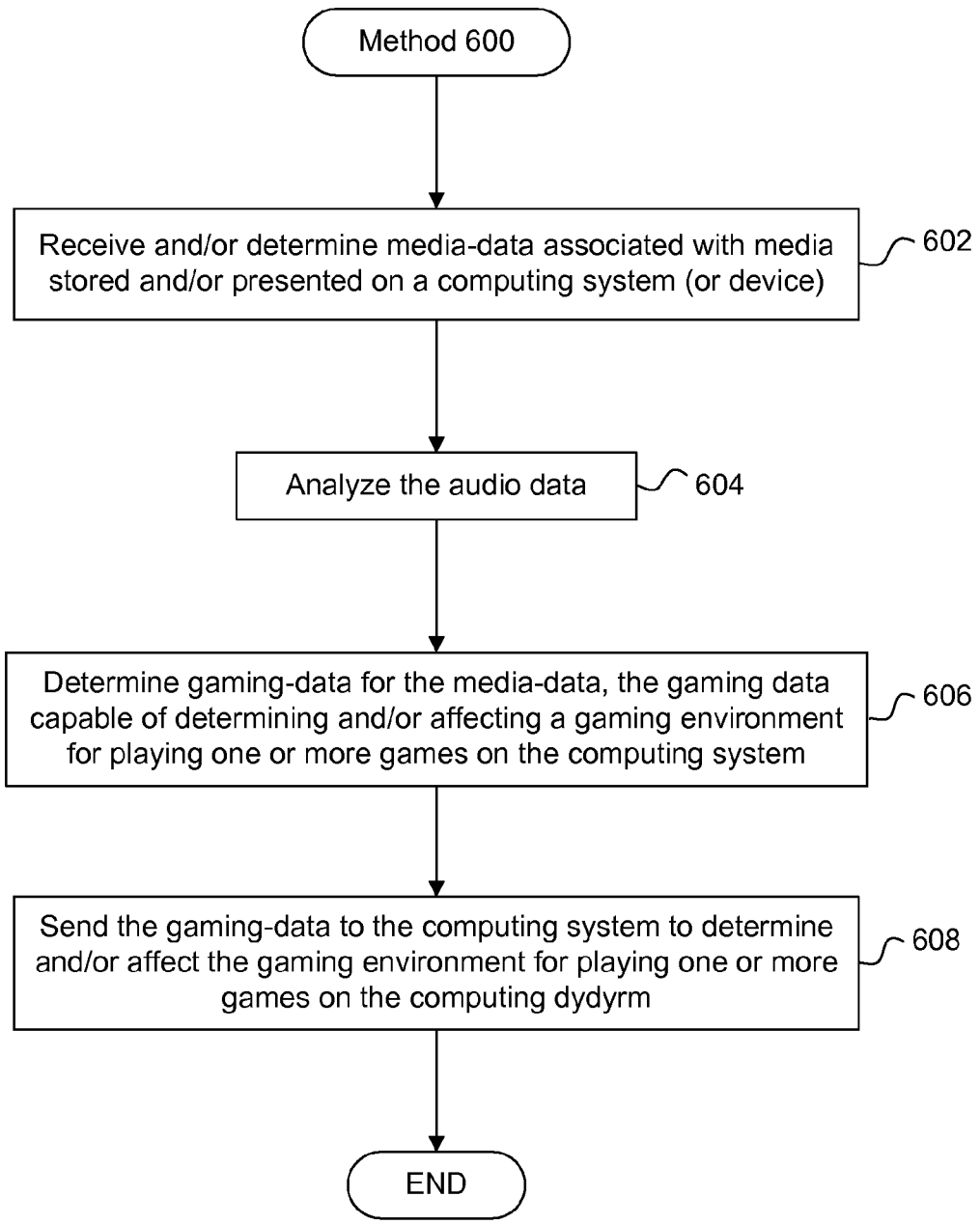
FIG. 6 depicts a method for providing a gaming environment in connection with a media environment in accordance with one embodiment of the invention.

FIG. 6 depicts a method 600 for providing a gaming environment in connection with a media environment in accordance with one embodiment of the invention. The method 600 can, for example, be used by a server that can communicate with one or more computing systems. Initially, media-data (e.g., audio-data related to audio presentation) associated with media stored and/or presented on a computing system is received and/or determined (602). Next, the media-data is analyzed (604). Accordingly, gaming-data is determined (606) for the audio data. It should be noted that the gaming-data is capable of determining and/or affecting a gaming environment for playing one or more games on the computing system. Subsequently, the gaming-data is sent (608) to the computing system to determine and/or affect the gaming environment for playing one or more games on the computing system.

Figure 7:
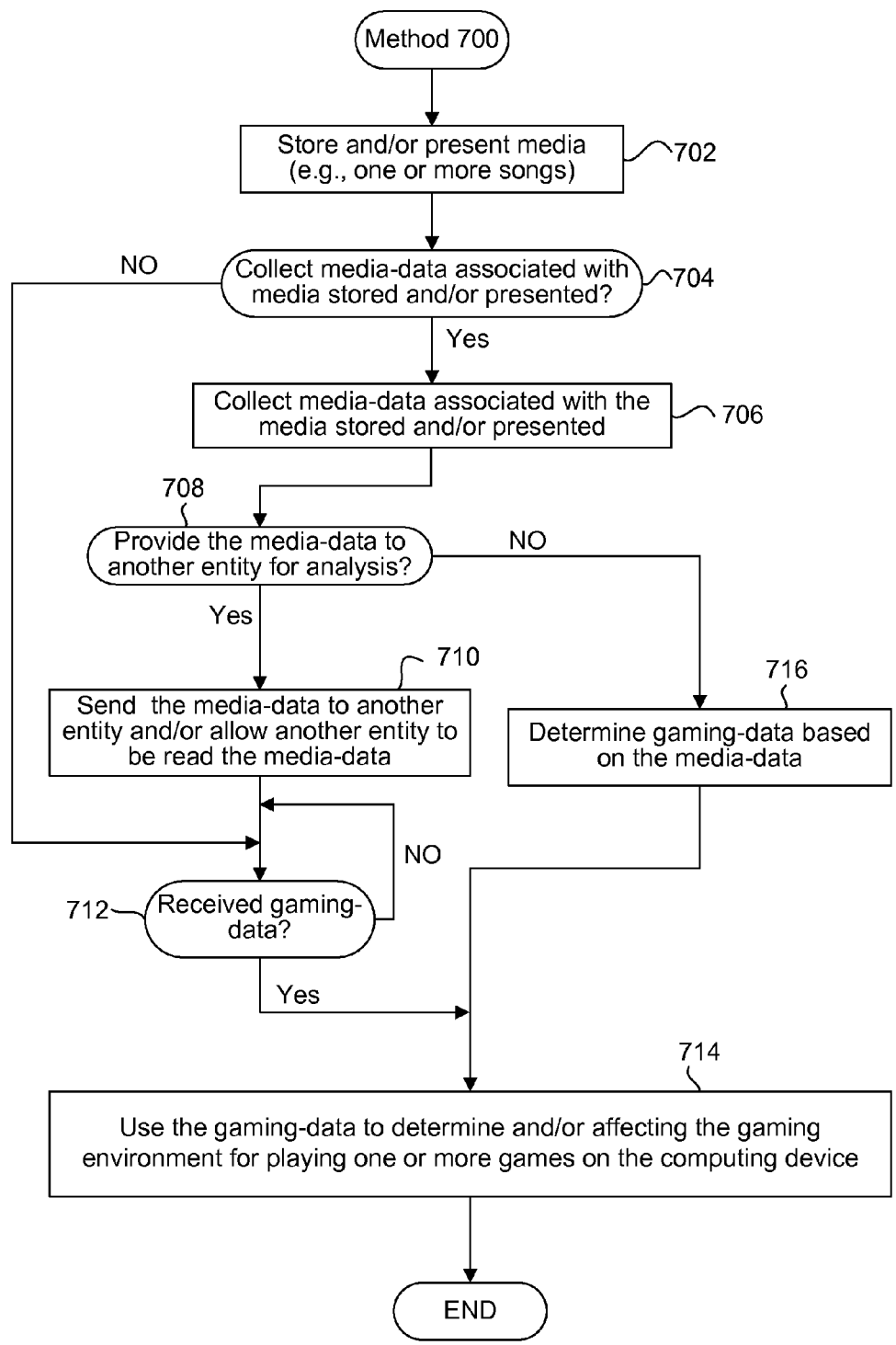
FIG. 7 depicts a method for playing a game on a computing device (or device) in accordance with one embodiment of the invention.

FIG. 7 depicts a method 700 for playing a game on a computing system (or device) in accordance with one embodiment of the invention. Method 700 can, for example, be used by a computing system that has both gaming and media presentation capabilities (e.g., an Apple iPod configured for both game play and presentation of media). Initially, media (e.g., one or more songs) can be stored on the computing system and/or presented (702) by the computing system. Next, it is determined (704) whether to collect media-data associated with the media stored and/or presented. If it is determined to collect media-data associated with the media stored and/or presented, media-data is collected (706). Thereafter, it is determined (708) whether to provide the media-data to another entity (e.g., a sever) for analysis. If it is determined (708) to provide the media-data to another entity, the media-data is sent to the other entity and/or the other entity is allowed to read the media-data (710). It should be noted that the other entity can analyze the media-data in order to determine gaming-data which it can sent to the computing system. Accordingly, it is determined (712) whether gaming-data is received. In effect, the method 700 can wait for gaming-data. If it is determined (712) that gaming-data is received, the gaming-data is used to determine and/or affect (714) the gaming environment on the computing systems. For example, one or more games can be provided for play on the computing system and/or one more games can be affected. It should be noted that if it is determined (704) not to collect media-data associated with the media stored and/or presented, it can be determined (712) whether gaming-data is received. It should also be noted that if it is determined (708) not to provide the media-data to another entity, the gaming-data can be determined (716) based on the collected (706) media-data. The gaming-data is used (714) to determine and/or affect the gaming environment for playing one or more games on the computing system. The method 700 ends after the gaming-data is used (714). Those skilled in the art will readily appreciate an operation can conceptually represent a design choice and it is not necessary that any implementation of the invention incorporate all of the operations and/or order of the operations depicted in a Figure. By way of example, there may be no need to perform the operations 704 and/or 708 as a computing system may be configured to collect data and provide it to another entity in accordance with the invention. As another example, a computing system may be configured to collect audio-data and determine the gaming-data.

The following applications are hereby incorporated herein by reference in their entirety for all purposes: (i) U.S. Pat. No. 7,046,230, filed Jul. 2, 2002, and entitled "TOUCH PAD FOR HANDHELD DEVICE," (ii) U.S. patent application Ser. No. 10/722,948, filed Nov. 25, 2003, and entitled "TOUCH PAD FOR HANDHELD DEVICE," (iii) U.S. patent application Ser. No. 11/144,541, filed Jun. 3, 2005, and entitled "TECHNIQUES FOR PRESENTING SOUND EFFECTS ON A PORTABLE MEDIA PLAYER," (iv) U.S. patent application Ser. No. 11/481,303, filed Jul. 3, 2006, and entitled "MEDIA MANAGEMENT SYSTEM FOR MANAGEMENT OF GAMES ACQUIRED FROM A MEDIA SERVER," (v) U.S. patent application Ser. No. 11/530,807, filed Sep. 11, 2006, and entitled "TECHNIQUES FOR INTERACTIVE INPUT TO PORTABLE ELECTRONIC DEVICES," (vi) U.S. patent application Ser. No. 11/530,767, filed Sep. 11, 2006, and entitled "INTEGRATION OF VISUAL CONTENT RELATED TO MEDIA PLAYBACK INTO NON-MEDIA-PLAYBACK PROCESSING," (vii) U.S. patent application Ser. No. 11/530,768, filed Sep. 11, 2006, and entitled "INTELLIGENT AUDIO MIXING AMONG MEDIA PLAYBACK AND AT LEAST ONE OTHER NON-PLAYBACK APPLICATION," and (viii) U.S. patent application Ser. No. 11/530,773, filed Sep. 11, 2006, and entitled "PORTABLE MEDIA PLAYBACK DEVICE INCLUDING USER INTERFACE EVENT PASSTHROUGH TO NON-MEDIA-PLAYBACK PROCESSING".

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for playing a game on a portable media device, said method comprising:
    outputting from the portable media device media content associated with a plurality of media assets wherein the media content is output in a media environment in which the game is not played;
    obtaining media-data associated with the plurality of media assets output in the media environment;
    determining, based on said media-data from the plurality of media assets, another plurality of media assets to output in a gaming environment wherein in the gaming environment, the game and media content from the other plurality of media assets are simultaneously output on said portable media device; and
    outputting on the portable media device the game and the media content from the other plurality of media assets in said gaming environment.

2. A computer-implemented method as recited in claim 1, wherein said media environment includes one or more components that can include digital media content and/or a digital media asset, and
    wherein said determining and/or affecting determines and/or affects one or more components of said gaming environment.

3. A computer-implemented method as recited in claim 1, wherein said method further comprises:
    obtaining, receiving, identifying and/or determining gaming-data that is effectively used to determine and/or affect said gaming environment.

4. A computer-implemented method as recited in claim 2, wherein said gaming-data is obtained, received, identified and/or determined based and/or by said media-data, and
    wherein said media-data effectively defines and/or describes one or more aspects, characteristics, and/or content associated with said media environment.

5. A computer-implemented method as recited in claim 1, wherein said media-data includes and/or is associated with a digital audio or a digital audio-visual media asset, and
    wherein said digital audio asset can include one or more songs capable of being played by said portable media device.

6. A computer-implemented method as recited in claim 5,
    wherein said one or more songs have been played on said portable media device, and
    wherein said media-data is collected for said one or more songs.

7. A computer-implemented method as recited in claim 5, wherein said media-data is collected at least partially based on one or more tags associated respectively with said one or more songs.

8. A computer-implemented method as recited in claim 6, wherein said one or more tags are ID3 complaint tags.

9. A computer-implemented method as recited in claim 1,
    wherein said portable media device effectively provides a media-player capable of playing audio; and
    wherein said media-data is associated with audio that is played and/or can be played by said media-player.

10. A computer-implemented method as recited in claim 9,
    wherein said media-data is associated with audio played by said media-player, and
    wherein said association is based on one or more of the following:
        one or more favorite songs,
        number of times one or more songs have been played,
        a play-list listing one or more songs,
        beats per minute for one or more songs,
        parameters associated with playing one or more songs, wherein said parameters can include: volume, base and/or terrible,
        physical location of said portable media device, and
        physical location of said portable media device when one or more of said song have been played.

11. A computer-implemented method as recited in claim 1, wherein said media-data is collected as meta-data which can be subsequently processed to determine gaming-data that can determine and/or affect said gaming environment.

12. A computer-implemented method as recited in claim 1, wherein one or more of the following can be determined and/or affected for said gaming environment:
    one or more parameters or setting for one or more games,
    one or more graphical components for one or more games,
    speed for playing said one or more games,
    characters or components of said one or more games,
    one or more specific attribute of one or more characters or components of said one or more games,
    one or more general attributes associated with one or more specific and/or general characters or components of said one or more games, and
    one or more specific and/or general scenes associated with one or more games.

13. A computer-implemented method as recited in claim 12, wherein said media-data includes and/or is associated with one or more songs that effectively determines and/or affects said gaming environment.

14. A computer-implemented method as recited in claim 13, wherein said song can be purchased in order to effectively determines and/or affects said gaming environment.

15. A computer-implemented method as recited in claim 13, wherein said song is composed and/or designed to determine and/or affect said gaming environment.

16. A computer-implemented method as recited in claim 1, wherein said media-data can be effectively shared between a plurality of devices and/or individuals associated with said plurality of portable media devices.

17. A computer-implemented method as recited in claim 16,
wherein said media-data can be used to determine gaming-data that can determine and/or affect said gaming environment, and
wherein said media-data and/or gaming-data media-data can be published for and/or shared by a gaming community.

18. A computer-implemented method as recited in claim 1, wherein said media-data includes or effectively provides a profile and/or a profile can be effectively derived from said media-data.

19. A computer-implemented method as recited in claim 18, wherein said profile can be shared between a plurality of devices, individuals associated with said plurality of portable media devices, and/or a community.

20. A computer-implemented method as recited in claim 1, wherein said media-data includes and/or is based on a play list and/or list of songs that effectively determines and/or affects said gaming environment.

21. A computer-implemented method as recited in claim 20, wherein said media-data determines and/or affects a game component, character, scene, and/or aspect of one or more games that can be played on said portable media device.

22. A computer-implemented method as recited in claim 21, wherein one or more games include a Role Playing Game (RPG) game.

23. A computer-implemented method as recited in claim 20, wherein the media-data includes and/or is determined based on one or more of the following: title, album art, mode, genre, beats per minute of audio and/or audio-visual media.

24. A portable media device for playing one or more games, wherein said portable media device is operable to:
output from the portable media device media content associated with a plurality of media assets wherein the media content is output in a media environment in which a game is not played;
obtain media-data associated with the plurality of media assets output in the media environment;
determine, based on said media-data from the plurality of media assets, another plurality of media assets to output in a gaming environment wherein in the gaming environment, the game and media content from the other plurality of media assets are simultaneously output on said portable media device; and
outputting on the portable media device the game and the media content from the other plurality of media assets in said gaming environment.

25. A device as recited in claim 24, wherein said media content is or has been stored on said device and/or effectively identified by said portable media device.

26. A device as recited in claim 25, wherein said media content includes one or more songs, thereby allowing one or more songs to effectively determine said one or more games and/or affect playing said one or more games.

* * * * *

UNITED STATES PATENT AND TRADEMARK OFFICE
CERTIFICATE OF CORRECTION

| | | |
|---|---|---|
| PATENT NO. | : 7,946,918 B2 | Page 1 of 1 |
| APPLICATION NO. | : 11/530846 | |
| DATED | : May 24, 2011 | |
| INVENTOR(S) | : Stanley C. Ng et al. | |

It is certified that error appears in the above-identified patent and that said Letters Patent is hereby corrected as shown below:

In column 4, line 41, delete "The" and insert -- the --, therefor.

In column 5, line 67, please delete "In general,".

In column 6, line 27, delete "and/software" and insert -- and/or software --, therefor.

In column 6, line 28, delete "out put" and insert -- output --, therefor.

In column 7, line 1, delete "it" and insert -- its --, therefor.

In column 7, line 31, delete "form" and insert -- from --, therefor.

In column 9, line 19, delete "an" and insert -- and --, therefor.

In column 12, line 35, in claim 11, delete "meta-data" and insert -- Meta-data --, therefor.

Signed and Sealed this
Twenty-ninth Day of November, 2011

David J. Kappos
*Director of the United States Patent and Trademark Office*